Nov. 16, 1937.  A. G. SCHNEIDER  2,099,630
TRANSMISSION
Filed March 1, 1933  8 Sheets-Sheet 1

Inventor
Adolf G. Schneider
By Wilson, Dowell, McCanna & Winterson
Attys.

Nov. 16, 1937.   A. G. SCHNEIDER   2,099,630
TRANSMISSION
Filed March 1, 1933   8 Sheets-Sheet 2

Inventor
Adolf G. Schneider

Nov. 16, 1937.  A. G. SCHNEIDER  2,099,630
TRANSMISSION
Filed March 1, 1933   8 Sheets-Sheet 3

Inventor
Adolf G. Schneider
By Wilson, Dowell, McCanna & Wintercorn
Attys.

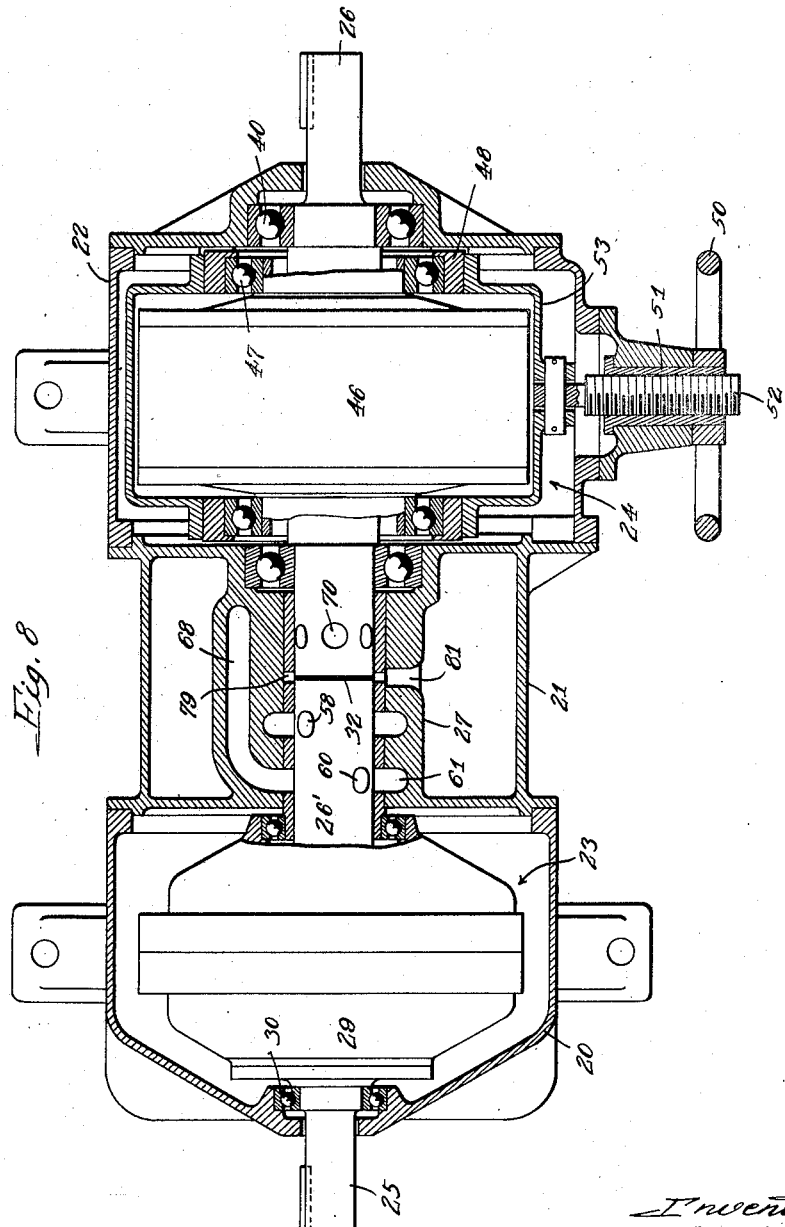

Nov. 16, 1937. A. G. SCHNEIDER 2,099,630
TRANSMISSION
Filed March 1, 1933   8 Sheets-Sheet 5
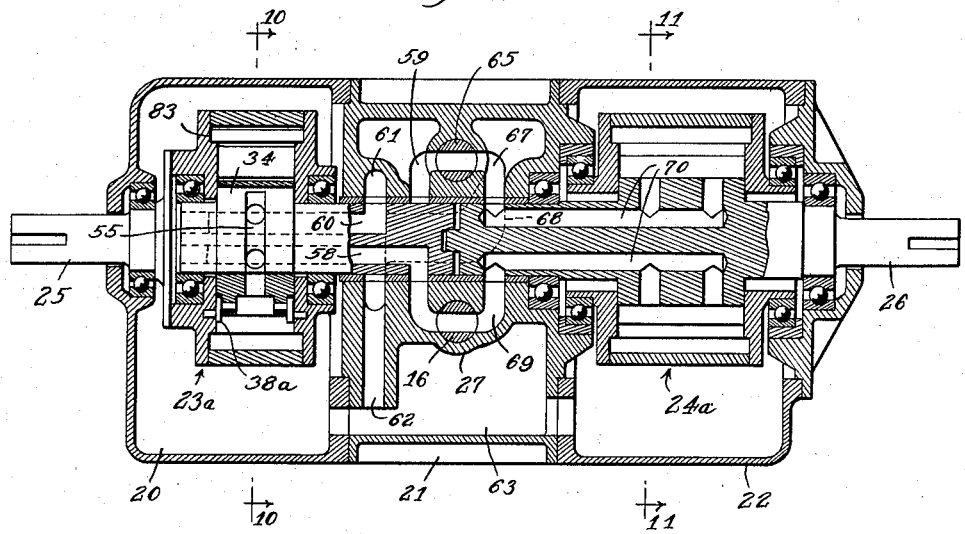
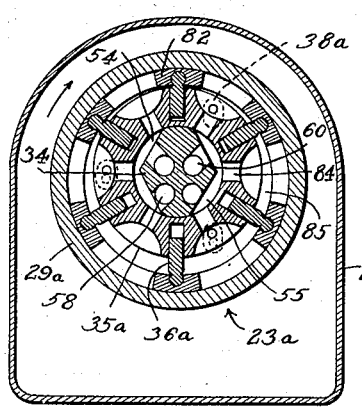
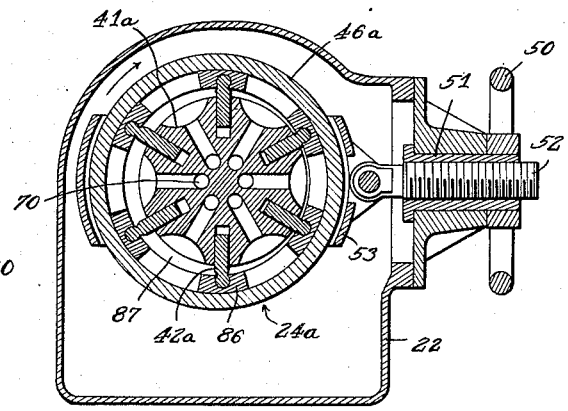
Inventor
Adolf G. Schneider Inventor
Adolf G. Schneider

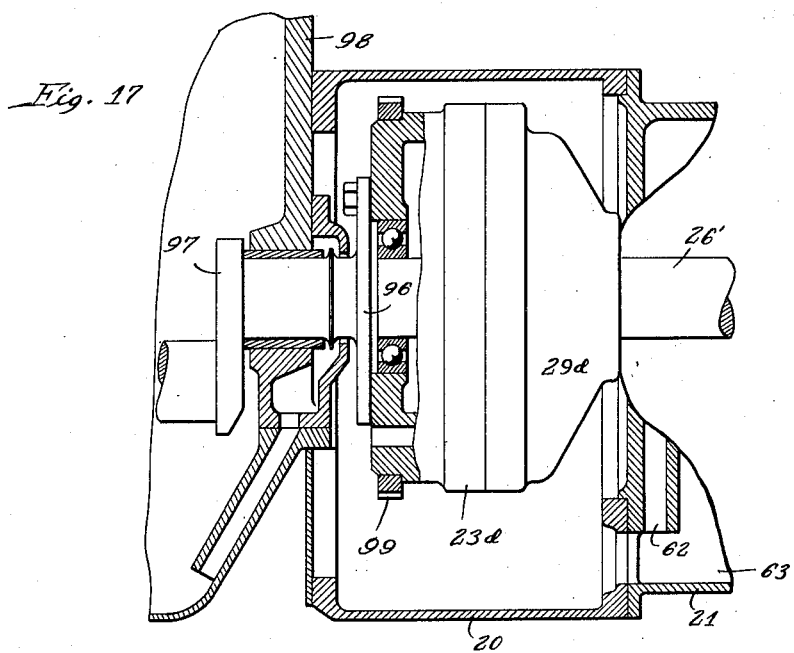
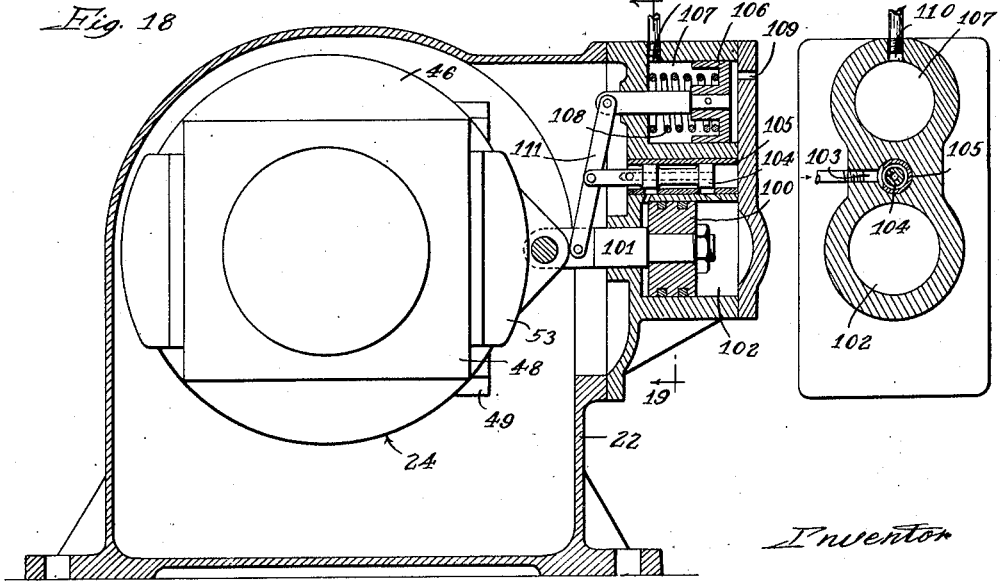

Patented Nov. 16, 1937

2,099,630

UNITED STATES PATENT OFFICE 2,099,630

TRANSMISSION

Adolf G. Schneider, Beloit, Wis.

Application March 1, 1933, Serial No. 659,146

38 Claims. (Cl. 60—53)

This invention relates to power transmissions generally and more particularly hydraulic variable speed transmissions.

Hydraulic transmissions of previous designs have been of rather complicated and expensive construction and not sufficiently compact for practical purposes. They have been objectionable furthermore because of long passages for fluid flow and the necessity for so many outside pipe connections, as well as the inability to incorporate controls handily. It is, therefore, the principal object of my invention to provide a transmission of simple, compact and economical construction having a centralized set of controls preferably directly between the pump and motor, and internal passages communicating therewith, whereby to avoid the outstanding objections present in the other designs.

Another important object of my invention consists in the arrangement of the pump and motor units on a common shaft, either the driven or the driving shaft. This gives a straight through drive and avoids the objections going with the use of a countershaft otherwise required. The same shaft furthermore has all of the fluid passages therein for conducting all fluid flowing between the pump and motor, so that the necessity for complicated piping is avoided.

Other objects and advantages of my invention will be brought out in the course of the following detailed description, in which reference is made to the accompanying drawings, wherein—

Fig. 8 is a horizontal section of Figure 1 showing the pump and motor rotors in elevation;

Figs. 9-11 are views similar to Figs. 1-3 showing a transmission of modified or alternative construction;

Fig. 17 illustrates the adaptability of the transmission to automotive purposes, showing the transmission directly coupled with the end of the engine crank shaft so that the rotor of the pump serves as a flywheel.

Fig. 18 is a section similar to Fig. 3 but showing an automatic hydraulic actuator for adjusting the eccentricity of the motor, and Fig. 19 is a cross-section on the line 19—19 of Fig. 18.

Similar reference numerals are applied to corresponding parts throughout the views.

Figure 1:
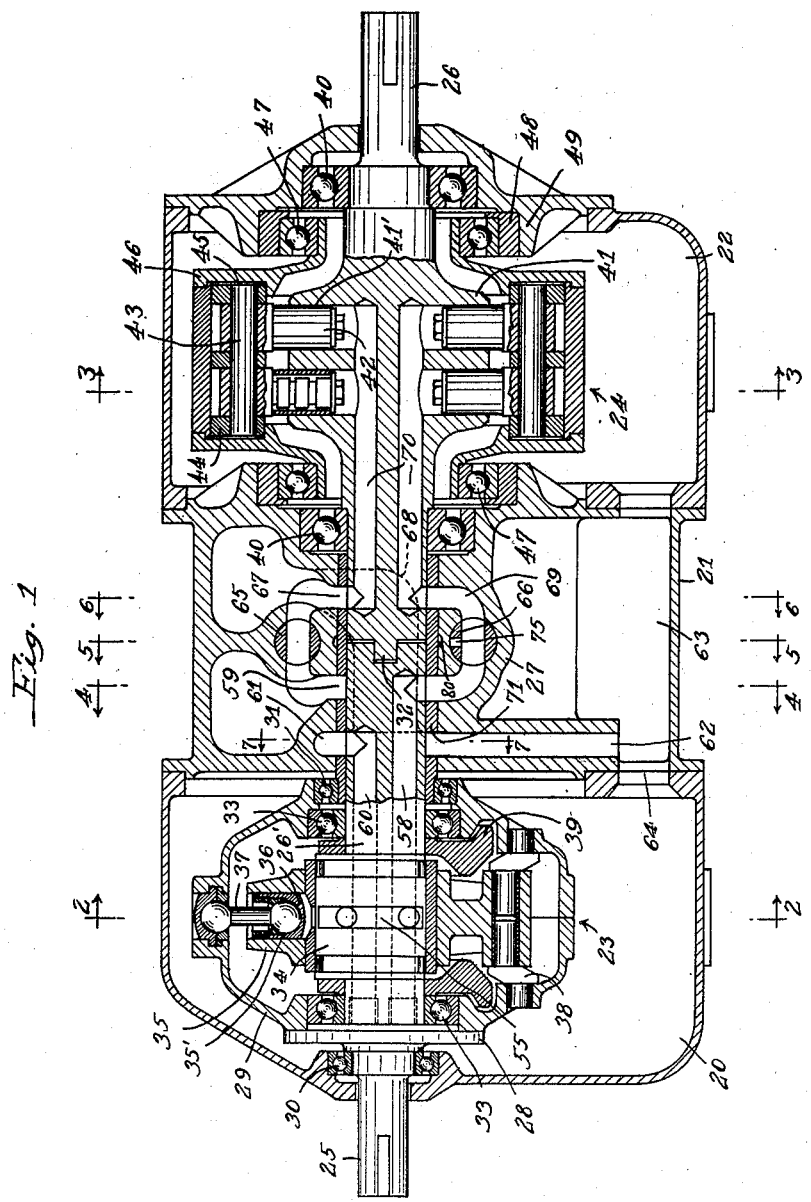
Figure 1 is a longitudinal section through a transmission made in accordance with the invention, the section being in the plane of the lines 1—1 of Figs. 2 and 3.
Figure 2:
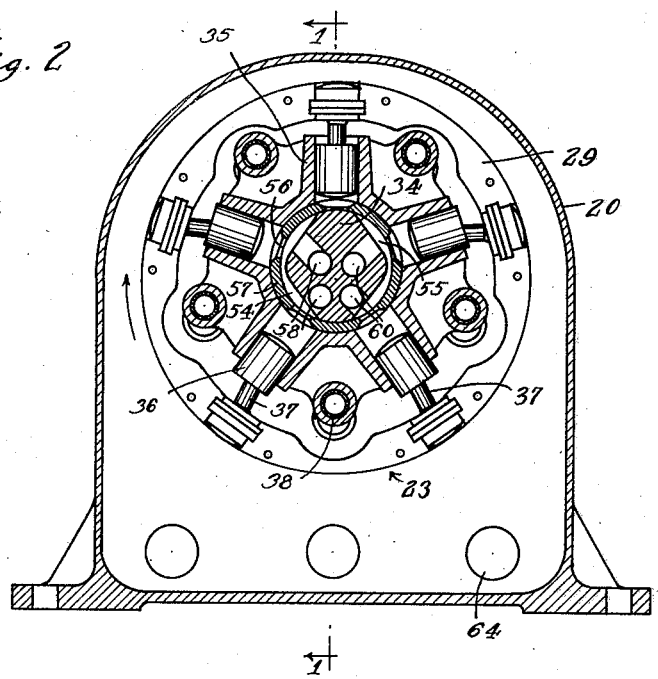
Figs. 2 and 3 are cross-sections on the correspondingly numbered lines of Figure 1 looking in the direction indicated by the arrows.

Referring first to Figs. 1–8, the transmission comprises a housing made up of three intercommunicating sections 20, 21 and 22. Section 20 contains the pump 23 and section 22 contains the motor 24, the units 23 and 24 being so named assuming that stub shaft 25 is the input or driving shaft and shaft 26 the output or driven shaft. It should be understood, however, that the pump may act as a motor and the motor as a pump, so that the invention is not to be considered as limited to either specific arrangement. The middle housing section 21 contains the control set 27, or what may be termed a valve chest, this location being ideal from the standpoint of shortening fluid travel and making for convenience in arranging for communication with the pump 23 on the one hand and the motor 24 on the other. The stub shaft 25 terminates just inside the housing section 20 in a flange 28 to which one end of the pump rotor 29 is secured. The rotor 29 is supported for rotation on the bearings 30 and 31. The shaft 26 extends through the motor 24 to the middle of the valve chest 27 where it is coupled, as indicated at 32, to a front shaft section 26'. In other words, there is a through shaft 26—26' common to the pump and motor, and, while I have for the sake of convenience in construction and assembly shown the through shaft in two parts, it should be understood that it may be in one piece.

The shaft section 26' is received in bearings 33 in the rotor 29 and has an eccentric portion 34 between these bearings on which a cylinder block 35 is rotatably mounted. The block 35 has five radial bores 35' in which pistons 36 are reciprocable, the pistons being connected by rods 37 with the rotor 29 so as to move the pistons in and out in the turning of the rotor relative to the eccentric. Cranks 38 couple the rotor 29 and cylinder block 35. The weights 39 turning with the shaft section 26' are for counterbalancing purposes, their eccentricity being opposed to that of the eccentric 34.

The shaft section 26 is received in bearings 40 and has an enlarged portion 41 constituting the cylinder block of the motor 24, in which there are two sets of radial bores 41', five bores to a set, in planes parallel to one another. Pistons 42 are reciprocable in these bores and are pivoted on pins 43 carried on slidable shoes 44 working in annular recesses 45 in the rotor 46. The latter is rotatably received in bearings 47 carried on slides 48 movable transversely to the axis of rotation in guides 49 provided at opposite ends of the housing section 22. The rotor 46 can be moved to eccentricity on either side of center by means of a hand wheel 50 fixed to the nut 51 threaded on screw 52 attached to the slides 48 by a suitable yoke 53. Any other suitable or preferred means may, of course, be employed for adjusting the position of the rotor and accordingly varying the stroke of the pistons 43.

The eccentric portion 34 of the shaft 26—26' has two channels 54 and 55 formed on diametrically opposite sides thereof (Fig. 2) for high and low pressure, respectively, or, what amounts to the same thing, for fluid discharge and intake, respectively. Ports 56 in a bushing 57 turning with the cylinder block 35 establish communication for either of the channels with the cylinder bores. Passages 58 extending lengthwise in the shaft section 26' establish communication between the discharge channel 54 and a pressure chamber 59 in the valve chest 27. Similar passages 60 afford communication between the intake channel 55 and a suction chamber 61 in the valve chest. A passage 62 in housing section 21 establishes communication between the suction chamber 61 and the sump 63 which extends the full length of the bottom of the three housing sections, the housing sections being in communication with one another through suitable ports 64. Oil or other liquid suitable for the present purposes is provided to a level above the lower end of the passage 62. From this description it must appear that in the turning of the pump rotor 29 in the direction indicated in Fig. 2, oil is drawn into the cylinder bores 35' through passages 60 and is discharged from the cylinder bores through passages 58, as they come into communication with the channels 55 and 54, respectively.

The valve chest 27 contains two rotary plug type valves 65 and 66, the former being an "idling" valve and the latter a "running" valve. The idling valve when opened establishes communication between the pressure chamber 59 and an exhaust chamber 67. The exhaust chamber communicates with the suction chamber 61 through a passage 68. Thus it is apparent that oil delivered under pressure from the pump 23 to the chamber 59 finds its way directly back to the intake of the pump, that is, the suction chamber 61, when the idling valve 65 is open. Consequently, there is no rotation of the shaft 26—26' under such conditions. There is, however, a pressure chamber 69 in communication with the pressure chamber 59 so long as the running valve 66 is open. Consequently, if the idling valve 65 is closed so as to cut off the by-passing of oil from the pressure side of the pump directly back to the suction side, oil under pressure is delivered through the running valve 66 to the pressure chamber 69. From here it is delivered through passages 70 to the bores 41' of the motor cylinder block 41. That is to say, through those passages 70 which communicate with the pressure chamber 69; there being at the same time other passages 70 exhausting oil from other cylinders to the exhaust chamber 67 (see Fig. 6). A bushing 71, which, as clearly appears in Figure 1 extends the full length of the valve chest 27, and is properly ported at the points where it traverses the pressure chamber 59 and suction chamber 61 so as not to interfere with the system of communications previously referred to, has two webs 72 separating the exhaust chamber 67 from the pressure chamber 69, as clearly appears in Fig. 6. In the rotation of the shaft 26—26' relative to the bushing, it is clear that the passages 70 move from communication with the one chamber into communication with the other, so as to serve as exhaust passages during the course of communication with the chamber 67, and as fluid delivery passages while in communication with the chamber 69.

Figure 3:
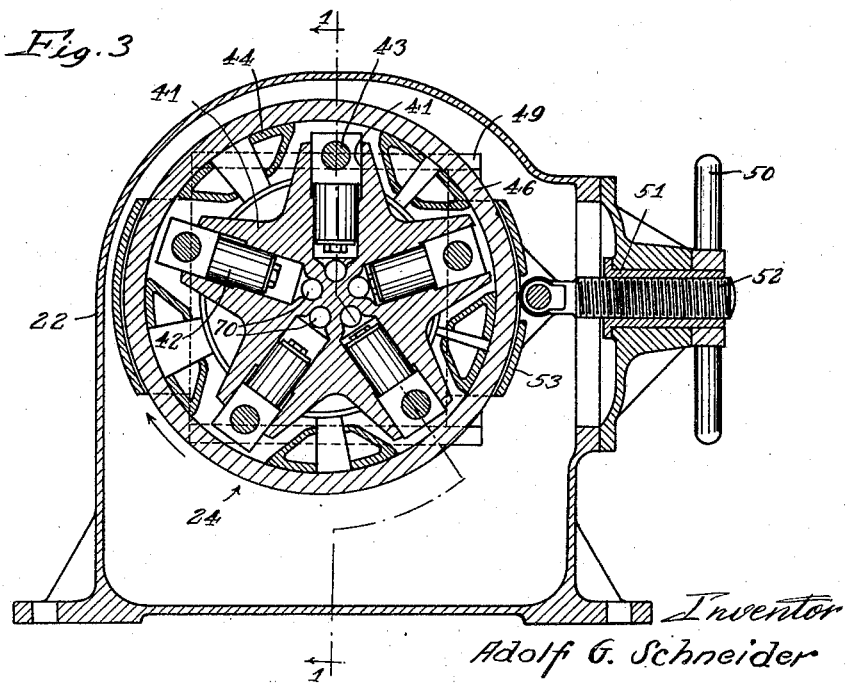
Figure 4:
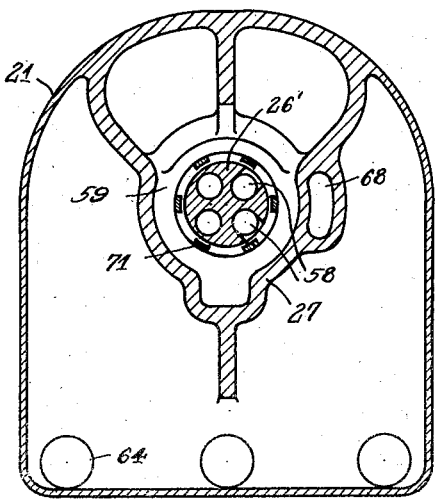
Figs. 4, 5 and 6 are cross-sections on the correspondingly numbered lines of Figure 1 looking in the opposite direction.
Figure 5:
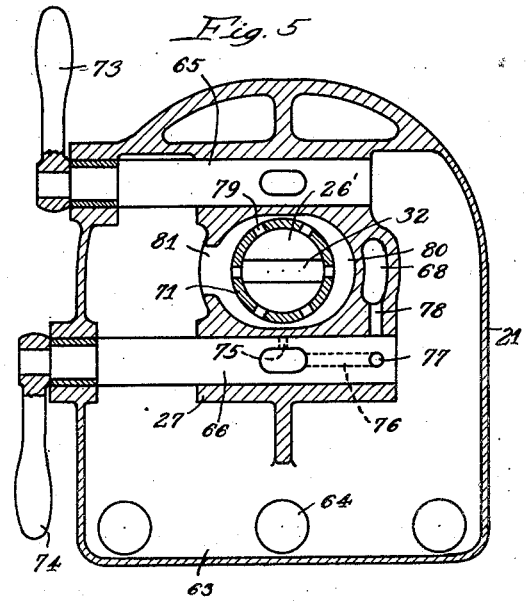
Figure 7:
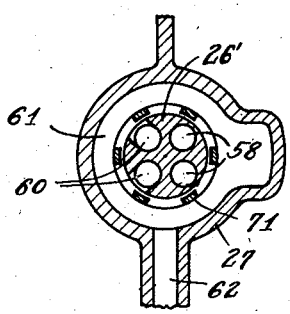
Fig. 7 is a sectional detail on the line 7—7 of Figure 1.
Figure 6:
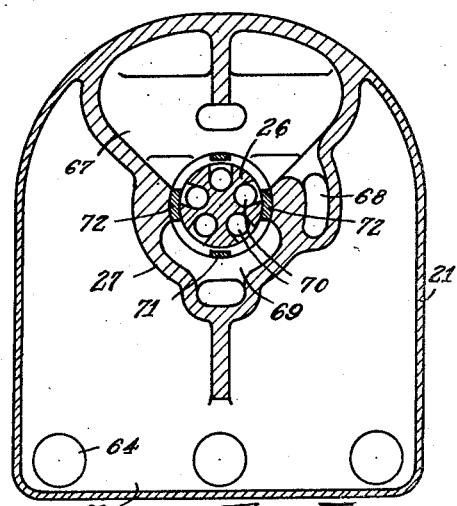

In operation, it must appear that when the rotor 46 of the motor 24 is on one side of the center of rotation of the shaft 26—26' as shown in Fig. 3, the rotor 46 will be turned in the direction indicated by the arrow as the pistons 42 in the lower bores are forced outwardly under pressure of the fluid delivered to the cylinder bores 41' and as the pistons in the upper bores are allowed to exhaust fluid from their bores through the remaining passages 70. If the rotor 46 is shifted to the other side of center the direction of rotation of the rotor will be reversed. On the other hand, if the rotor 46 is moved to a dead center position such that there can be no movement of fluid into or out of any of the cylinder bores, the block 41 of the motor 24 will be locked with the rotor 29 of the pump 23 and turn with it at the same speed, this condition being referred to as direct drive. It must further appear from the description that owing to the fact that there are double the number of cylinder bores in the motor block 41 as there are in the pump block 35, a mechanical advantage is derived and the shaft 26—26' will operate with increased torque as compared with the torque delivered to the shaft 25, but at a decreased speed; that is to say, under all conditions other than direct drive. For example, let us assume that the rotor 46 is set at half the radius of operation of the rotor 29, so that the total displacement of two pistons 42 is equal to the displacement of one of the pistons 36 and further assuming the shaft 26—26' to be stationary, then, if the rotor 29 is given one complete turn, the pump 23 will supply sufficient oil to the bores 41' of the motor cylinder block 41 to turn the rotor 46 of the motor 24 one complete turn. However, since the pump will function only by turning of the rotor 29 relative to the eccentric 34, and the shaft 26—26' makes one turn in one complete turn of the rotor 46, it follows that there must be two turns of the rotor 29 to produce one turn of the rotor 46. The mechanical advantage under the condition stated would accordingly be 2:1, the shaft 26 being turned at half the speed of the shaft 25. As another example, let us assume that the rotor 46 is set for the same radius of operation as the rotor 29. In that event is requires two complete turns of the pump cylinder block 35 relative to the rotor 34 to furnish sufficient oil to the motor cylinder block for one complete turn of the rotor 46. Under such conditions, since the rotor 29 of the pump 23 must turn twice relative to the eccentric 34 and the eccentric 34 makes one complete turn in one turn of the rotor 46, it follows that it requires three turns of the shaft 25 to produce one turn of the shaft 26. The mechanical advantage is accordingly 3:1.

In the operation above described, it may be assumed that the transmission is incorporated in an automobile or other motor vehicle in which the shaft 25 is fixed to or constitutes the end of the crank shaft of an internal combustion engine or other prime mover, or in which the rotor 29 is fastened directly to the end of the crank shaft to serve as the flywheel of the engine. Before the engine is started the idling valve 65 is opened, and later while the engine is idling and the valve 65 is still open, the rotor 29 of the pump turns with the engine while the shaft 26—26' coupled with the propeller shaft of the vehicle remains at a standstill. The motor 24 meanwhile is also at a standstill, there being no oil circulation therein during idling. When the vehicle is to be brought under way, the rotor 46 of the motor 24 is moved to a position of maximum eccentricity so as to make available maximum starting torque when the idling valve 65 is closed. The closing of the idling valve can be graduated so as to simulate the gradual engagement of a friction clutch in bringing the vehicle into motion smoothly. In this "throttling" period the oil pressure builds up until the transmission torque overcomes the resistance of the propeller shaft, that is, the resistance to turning of the shaft 26—26'. When the idling valve is completely closed, the engine may be speeded up to increase power, oil pressure and torque. On the other hand, by decreasing the eccentricity of the rotor 46 of the motor 24 one may increase the speed of the vehicle up to a point where, as stated before, there is direct drive, namely, when there is zero eccentricity of the motor rotor. Levers 73 and 74 are shown on the ends of the valves 65 and 66 for direct manual operation, but it must appear that suitable linkages may be connected therewith for remote manual control or automatic control of the valves.

In passing, attention is called to the bleeder hole 75 opening off the diametrical port in the running valve 66. This bleeder hole is for the relief of any pressure in the chamber 69 when the transmission is operating with direct drive and the running valve 66 is closed, suitable provision being made for the automatic closing of the running valve when the rotor 46 of the motor 24 is brought to dead center. This relief of pressure is to avoid undue stress on the motor if the rotor thereof happens to be just a trifle off center when it should be on dead center, the slight eccentricity resulting in the building up of pressure in the same way as the pump 23 builds up pressure. The bleeder hole 75 conducts oil from the chamber 69 into the diametrical port of the running valve 66 and from there the oil is conducted through a longitudinal passage 76 to another diametrical port 77 which in the closed position of the running valve communicates with a duct 78 opening into the passage 68 previously described. The passage 68, it will be remembered, is an exhaust passage emptying into the suction chamber 61.

It will further be observed in passing that if any oil from the pressure chamber 69 finds its way in between the shaft sections 26—26' at the coupling 32, it will be exhausted through ports 79 in bushing 71 into an annular chamber 80 which has a discharge opening 81 for discharge of the oil to the sump 63. In that way there is no danger of any pressure being built up between the shaft sections tending to force the same apart, and end thrust on the eccentric 34 on the one hand and on the bearings 40 on the other hand, is accordingly avoided.

Referring now to Figs. 9-11, this modified or alternative construction differs from the previous one principally in regard to the construction of the pump and motor. The pump 23—a and the motor 24—a are of a vane type, as clearly appears in Figs. 10 and 11. In this construction the outer rotor 29—a of the pump is connected with the inner rotor 35—a by means of small separate crank members 38—a. The vanes 36—a are pivoted in shoes 82 slidable in the annular guideway 83 provided in the outer rotor 29—a. The radial bores 84 are provided in the inner rotor 35—a to connect the working chambers 85 with the discharge and inlet channels 54 and 55, respectively. The construction of the motor 24—a is along the same lines except, of course, that the eccentricity of the outer rotor 46—a with respect to the inner rotor 41—a is adjustable by means of the hand wheel 50, nut 51, and screw 52, as described in the previous form. The vanes of the motor are indicated at 42—a and the sliding shoes therefor at 86. The working chambers are numbered 87. In this transmission it is evident that the passages 58 conduct the fluid under pressure from the working chambers 85 to the pressure chambers 59 and 69 and that the passages 60 conduct the fluid to the working chambers 85 from the suction chamber 61. The fluid is delivered under pressure from chamber 69 to certain working chambers 87 of the motor through certain passages 70, and is exhausted from the other working chambers 87 through the remaining passages 70 to the suction chamber 61 by way of the exhaust chamber 67 and passage 68.

Figure 12:
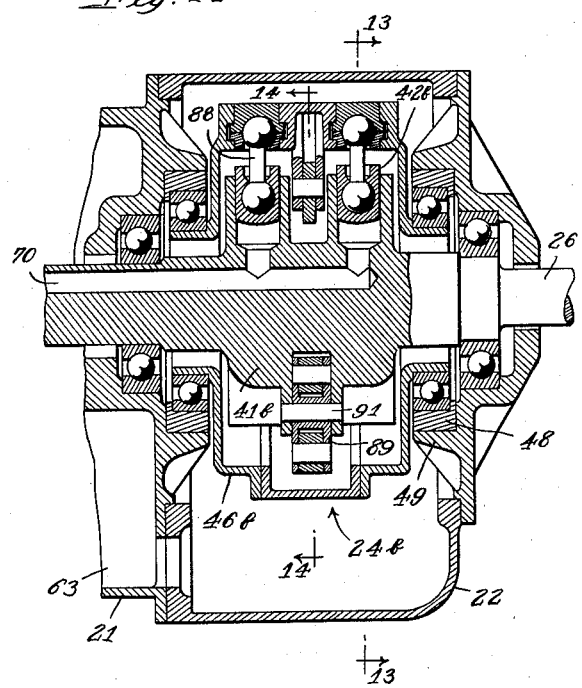
Figs. 12 and 13 are a longitudinal section and a cross-section, respectively, through the motor end of a transmission of a further modified or alternative construction, Fig. 13 being taken on line 13—13 of Fig. 12.
Figure 14:
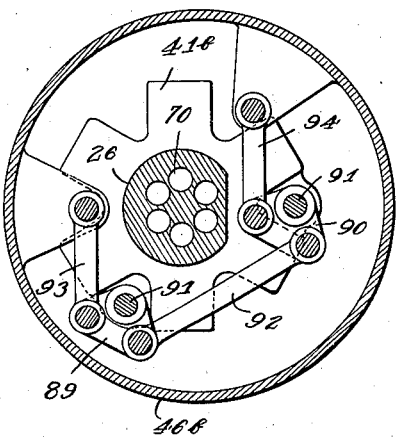
Fig. 14 is a cross-section on the line 14—14 of Fig. 12.
Figure 13:
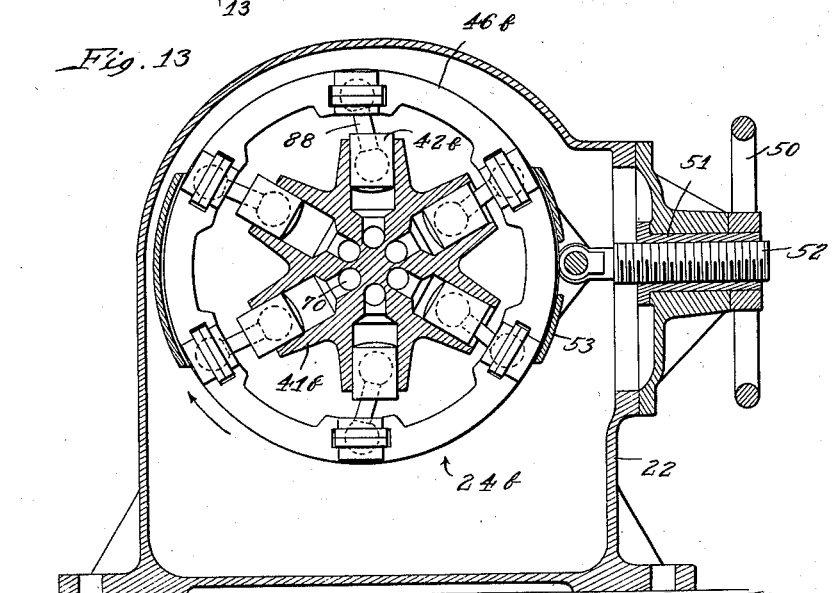

Referring to Figs. 12-14, a motor 24—b is shown quite similar to the motor 24 first described but having the pistons 42—b in the cylinder block 41—b connected with the rotor 46—b by ball-ended rods 88 similar to the rods 37 shown in connection with the pump 23 in the first form. In this case the sliding shoes 44 are supplanted by interlinked bell cranks 89 and 90 to provide a universal driving connection between the cylinder block 41—b and the rotor 46—b, that is to say, a driving connection in any position of eccentricity of the rotor within the normal operating range. The bell cranks are pivoted on the cylinder block 41—b, as indicated at 91, and are linked together as shown at 92. Two other links 93 and 94 connect the bell cranks with the rotor 46—b. The same form of means for adjusting the eccentricity of the rotor is shown here as in the first form, the rotor 46—b being carried on slides 48 working in guides 49, as in the first form.

Figure 15:
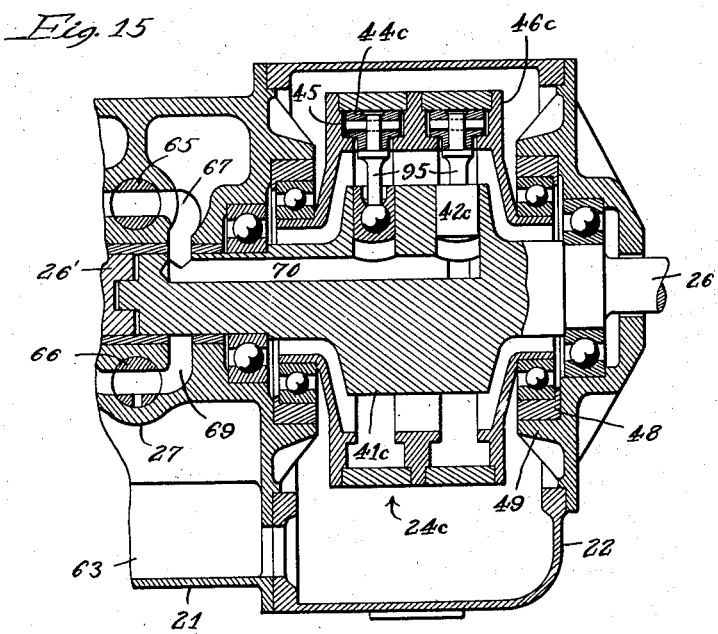
Figs. 15 and 16 are views similar to 12 and 13 of another modified or alternative construction.
Figure 16:
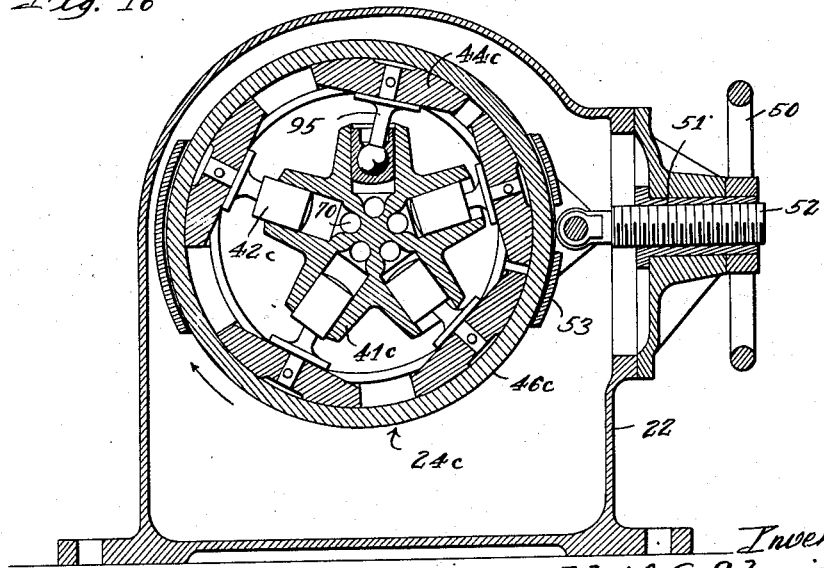

The motor 24—c shown in Figs. 15 and 16 is quite similar to the motor 24 of the first form but has pistons 42—c connected by special ball-ended rods 95 to shoes 44—c slidable in the annular guideway 45 provided in the rotor 46—c. The rods 95 are fastened rigidly to the shoes 44—c.

In Fig. 17 I have shown a pump 23—d mounted on the rear end flange 96 of the crank shaft 97 of an internal combustion engine 98 to serve as the flywheel of the engine. It will be noticed that a ring gear 99 is provided directly on the periphery of the rotor 29—d to be utilized in starting the engine, just as in the case of ring gears on conventional flywheels. The pump shaft 26' is shown extending rearwardly from the pump, and the front portion of the middle housing section 21 is also shown, and it may be assumed that the motor and valve chest similar to that of Figure 1 or any of the other forms is provided in connection with the pump 23—d to complete the transmission.

Figs. 18 and 19 show an automatic mechanism to take the place of the hand wheel 50, nut 51 and screw 52 previously described for adjusting the eccentricity of the motor rotor 46. This mechanism is one controlled by the vacuum in the intake manifold of the engine in connection with which the transmission is used, such, for example, as the engine 98. A piston 100 is connected by means of a rod 101 with the slides 48 in which the rotor 46 is carried, and this piston is movable in a cylinder 102 under oil pressure. The oil pressure may be from any suitable source, but is preferably from the chamber 59 of the transmission, delivered through a suitable conduit to the port 103 to the control valve 104. The latter works in a sleeve 105 provided with ports communicating with opposite ends of the cylinder 102. Another piston 106 working in a cylinder 107 is normally urged to one end of the cylinder by a spring 108 and is subject to atmospheric pressure through the vent 109 on one side and to whatever reduction in pressure there is in the intake manifold of the engine through the port 110 which is suitably connected with the intake manifold by a conduit, not shown. A single fulcrum lever 111 interconnects the piston 100, valve 104 and piston 106, as shown. When the vacuum in the intake manifold is decreased, the spring 108 moves the piston 106 to the right and the valve 104 is accordingly moved in the same direction, thereby connecting the right end of cylinder 102 with the pressure port 103. The piston 100 is therefore moved to the left under oil pressure and increases the eccentricity of the rotor 46 and accordingly increases the torque of the driven shaft 26. Oil behind the piston is discharged behind the valve 104 directly to the sump. The movement of the piston 100 is limited by reason of the fact that as the piston moves to the left, the valve 104 is likewise moved to the left and at a predetermined instant cuts off communication between the cylinder 102 and the pressure port 103. In like manner the exhausting of oil from behind the piston is cut off, so that the piston is locked in the new position. On the other hand, when the vacuum in the intake manifold increases, the piston 106 moves to the left against the action of spring 108. In such movement the valve 104 is moved to the left and establishes communication between the left end of the cylinder 102 and the pressure port 103 to cause movement of the piston 100 to the right. Oil in front of the piston escapes through the longitudinal passage in the valve 104 and is discharged directly to the sump. Here again it is apparent that as the piston 100 moves to the right it moves the valve 104 to the right and at a predetermined instant the communication between the pressure port 103 and the cylinder 102 is cut off and at the same time the exhaust of oil from the cylinder is cut off so that the piston 100 is locked in its new position. The movement of the piston causes a decrease in the eccentricity of the motor rotor 46 and accordingly increases the speed of the driven shaft 26. The spring 108 has such pressure that in a certain vacuum range, the piston 100 is holding the rotor 46 on dead center for direct drive.

It is believed the foregoing description conveys a good understanding of all of the objects and advantages of my invention. While reference has been made in the description to use of the transmission in connection with internal combustion engines, it should be understood that it is immaterial what type of prime mover furnishes the power. Then, too, while I have so designed the transmission that it is adaptable for use on automobiles, trucks, and busses, it should be understood that the same may be used on locomotives or for marine purposes, and will undoubtedly find numerous applications for industrial purposes. In conclusion, I would also add that it is immaterial which end is the driving end of the transmission and which the driven end; the pump may act as a motor and the motor as a pump, and the claims should be so understood; that is to say "motor" and "pump" are interchangeable terms. When the hollow shaft 26—26' is used to drive the transmission, the pump rotor 29 and shaft 25 will be driven at a speed equal to, or higher or lower than the speed of the hollow shaft. The appended claims have been drawn with a view to covering all legitimate modifications and adaptations.

I claim:

1. A fluid operated transmission comprising in combination a power operated pump for delivering fluid under pressure and comprising a housing, a motor operable by the fluid and comprising a housing, said pump and motor being in coaxial spaced relation, a central, axial, hollow driven shaft common to the pump and motor and turning with both, a stationary control housing between the pump and motor and joining their housings to form a unitary assembly, said control housing having passages therein, the hollow shaft having longitudinal channels provided therein to conduct all of the moving fluid through the passages in the control housing to and from the pump and motor, and means on the control housing for controlling the flow of fluid through said shaft.

2. A fluid operated transmission comprising in combination a power operated pump for delivering fluid under pressure, a motor operable by the fluid, said pump and motor being in coaxially spaced relation, a central, axial, hollow driven shaft common to the pump and motor and turning with both, a stationary control housing between the pump and motor, said housing having intake, exhaust, and pressure chambers therein, the exhaust and intake chambers intercommunicating, the hollow shaft having one set of passages provided therein leading to and from the pump for withdrawing fluid from the intake chamber in the control housing and delivering fluid under pressure to the pressure chamber in the control housing, and having a second set of passages for delivering fluid under pressure from the pressure chamber in said control housing to the motor and for exhausting fluid from the motor to the exhaust chamber in the control housing, and a valve in the control housing for controlling communication between the pressure chamber and the exhaust chamber, said valve when opened permitting idle operation of the pump.

3. A fluid operated transmission as set forth in claim 2, including another valve in the control housing for controlling communication between the second set of passages and the pressure chamber.

4. In a fluid operated transmission, the combination of a power operated pump rotor, an inner rotor turning therewith, a stationary support for said rotors, a hollow driven shaft having at one end thereof an eccentric relative to which the inner rotor is arranged to turn, the pump having working chambers for the intake and discharge of fluid, a motor in coaxially spaced relation to said pump and comprising an outer rotor surrounding the other end of said shaft and an inner rotor on said shaft, the motor having working chambers to receive fluid from the pump, a stationary support for said motor, a housing between the pump and motor connecting said stationary supports, control means in said housing arranged to control the flow of fluid back and forth between the pump and motor, and said shaft having passages provided therein for conducting fluid relative to the control means to and from the pump and motor.

5. In a fluid operated transmission comprising a fluid pump and a fluid operated motor in coaxially spaced relation, a through shaft common to the pump and motor and having a pump eccentric on one end cooperating with a pump cylinder block and having on the other end a motor cylinder block, a stationary valve chest surrounding the shaft between the pump and motor and provided with intake, pressure, and exhaust chambers, and three sets of longitudinal passages provided in said shaft opening to the periphery thereof in three different planes at right angles to the shaft, there being one set for the motor communicating with the cylinders of the motor block and throughout half a turn of the shaft with the pressure chamber in the valve chest and throughout the other half of a turn with the exhaust chamber, the other two sets of passages being in communication through the pump eccentric with the pump, the one set withdrawing fluid continuously from the intake chamber in the valve chest and the other set continuously delivering fluid under pressure to the pressure chamber in the valve chest, and said exhaust chamber and intake chamber being in communication with each other.

6. In a fluid operated transmission, the combination of a power operated fixed displacement pump, a shaft having an eccentric forming a part of the pump, the pump comprising a radial cylinder block bearing on said eccentric with the inner ends of the cylinder bores arranged to communicate with radial ports provided in the eccentric, the shaft being common to the pump and a motor driven thereby and being arranged to be driven by the motor, a motor in coaxial relation to the pump and comprising an outer rotor adjustable as to eccentricity relative to the shaft, and a radial cylinder block rigid and coaxial with the shaft and providing cylinder bores receiving pistons extending therein from the rotor, a control housing between the pump and motor, longitudinal passages in said shaft extending from the control housing to the pump eccentric ports for the delivery of fluid to the pump cylinders and the discharge of fluid under pressure from the pump cylinders to a pressure chamber in the control housing, the control housing also having an exhaust chamber therein, and other longitudinal passages in said shaft extending from the control housing to the motor, each communicating with one of the bores in the cylinder block for the delivery and exhausting of pressure fluid to and from said bores, the other end of said passages communicating through part of a turn of the shaft with the pressure chamber and through another part of a turn of the shaft with the exhaust chamber.

7. In a fluid operated transmission comprising a power operated pump serving as the source of pressure fluid and a coaxially arranged motor operable by the pressure fluid, said pump and motor having separate housings, a control housing having the pump and motor housings detachably secured to the opposite sides thereof, aligned companion shaft sections in the pump and motor housings coupled together in the control housing to form a single driven shaft common to the pump and motor, the shaft sections having channels therein communicating with said control housing, and valve means in said control housing with which said channels communicate for controlling the flow of fluid to and from the pump and motor.

8. In a fluid operated transmission, the combination of a rotary pump having a housing, and a variable delivery fluid operated motor in coaxial relation with the pump and having a housing, the transmission including a rotary shaft extending from the pump and having working chambers of said motor integral therewith, a stationary control housing joined to the pump and motor housings and having said shaft extending therein, said control housing having pressure and exhaust chambers therein for the delivery of fluid under pressure to the motor and the exhausting of fluid therefrom, and conduits in said shaft communicating with the chambers in said control housing at one end and at the other end with the pump and with the working chambers of said motor for the flow of fluid to and from the latter.

9. In a fluid operated transmission, the combination of a central control housing, a rotary shaft extending therethrough, a pumping mechanism on one end of said shaft, a fluid operated motor mechanism on the other end of said shaft, the shaft turning with both of said mechanisms, power being transmitted to the one mechanism at one end of the shaft and from the mechanism at the other end of said shaft, the control housing having high and low pressure chambers therein, low pressure conduits in said shaft extending from the housing to the pumping mechanism and having communication with the low pressure chamber continuously in the rotation of the shaft, high pressure conduits in the shaft extending from the housing to the pumping mechanism and having communication with the high pressure chamber continuously in the rotation of the shaft, and other conduits in said shaft extending from the housing to the motor mechanism and having communication during half a turn of the shaft with the high pressure chamber and during the other half of a turn of the shaft with the low pressure chamber.

10. A transmission as set forth in claim 9 wherein the control housing has the low pressure chamber completely surrounding the shaft at one point for continuous communication with the low pressure conduits and halfway around the shaft at another point for communication with the third mentioned conduits during half a turn of the shaft, and wherein the high pressure chamber extends the other halfway around the shaft at the last mentioned point for communication with the third mentioned conduits during the other half turn of the shaft, and extends completely around the shaft at another point for continuous communication with the high pressure conduits.

11. A transmission as set forth in claim 9 including valve means in the control housing for selectively placing the high and low pressure chambers in communication.

12. In a fluid transmission of the motor and pump type, a pump for supplying pressure fluid and a motor operable by the pressure fluid, a two-section main shaft common to the pump and motor and having longitudinal passages provided therein, the one section projecting from the pump and the other projecting from the motor and having the adjacent ends aligned for coupling and coupled to transmit rotation from one to the other, a valve chest surrounding the coupled ends of the shaft sections having passages provided therein for conducting fluid flowing through the aforesaid longitudinal passages provided in the shaft sections, said valve chest also containing a relief port communicating with the coupled ends of said shaft sections to relieve fluid pressure therebetween, and valve means in the valve chest for controlling fluid flow through the shaft sections.

13. A transmission as set forth in claim 12, including a single elongated bushing in the valve chest surrounding the coupled ends of the shaft sections with a close working fit, said bushing having ports provided therein to establish communication between the longitudinal passages in the shaft sections and the passages in the valve chest, and having one or more other ports establishing communication between the relief port and the space between the ends of the shaft sections.

14. A power transmission apparatus comprising a driving shaft, a plurality of radially arranged pump cylinders in one plane turning with the shaft, a driven shaft in coaxial end-to-end relation to the driving shaft, an eccentric on the end of said driven shaft providing an off-center bearing for the pump cylinders, and a plurality of radially arranged motor cylinders in another plane turning with the driven shaft, the pump cylinders and motor cylinders being in axially spaced substantially parallel planes, the driven shaft being provided with longitudinal bores for directing the flow of fluid between the pump cylinders and motor cylinders.

15. A power transmission apparatus comprising a driving shaft, a plurality of radially arranged pump cylinders turning with the shaft, a driven shaft in coaxial end-to-end relation to the driving shaft, an eccentric on the end of said driven shaft providing an off-center bearing for the pump cylinders, a plurality of radially arranged motor cylinders turning with the driven shaft, the pump cylinders and motor cylinders being in substantially parallel planes, the driven shaft being provided with two sets of longitudinal bores, the one set communicating with the pump cylinders and extending from the eccentric toward the motor cylinders and the other set communicating with the motor cylinders and extending from the motor cylinders toward the eccentric, the two sets of bores terminating in spaced relation to one another at a portion of the shaft intermediate the pump and motor and communicating with the periphery of the shaft, a valve chest enclosing said intermediate portion of the shaft and having passages provided therein establishing communication between the two sets of bores, and valve means for controlling fluid flow through said passages.

16. A variable speed power transmission apparatus comprising a driving shaft, a plurality of radially arranged pump cylinders turning with said shaft, a coaxial driven shaft, a plurality of radially arranged motor cylinders turning with the driven shaft, the motor cylinders being in a plane substantially parallel with but axially spaced from the pump cylinders, pistons in the pump cylinders, means operative by relative rotation of said shafts for reciprocating said pistons, pistons in the motor cylinders, means for varying the stroke of said motor pistons and delivering the power developed in the motor cylinders to the driven shaft, and longitudinal conduits in the driven shaft for directing all of the flow of fluid between the pump cylinders and motor cylinders.

17. A variable speed power transmission apparatus comprising a driving shaft, a plurality of radially arranged pump cylinders turning with said shaft, a coaxial driven shaft, a plurality of radially arranged motor cylinders turning with the driven shaft, the motor cylinders being in a plane substantially parallel with the pump cylinders, pistons in the pump cylinders, means operative by relative rotation of said shafts for reciprocating said pistons, pistons in the motor cylinders, means for varying the stroke of said motor pistons and delivering the power developed in the motor cylinders to the driven shaft, a fluid control housing surrounding an intermediate portion of said shaft between the pump and motor cylinders, one set of longitudinal conduits in said shaft communicating with the pump cylinders and extending to said housing, another set of longitudinal conduits in said shaft communicating with the motor cylinders and extending to said housing, the housing having passages provided therein establishing communication between the two sets of conduits, and valve means controlling fluid flow through said passages whereby to control the flow of fluid between the pump cylinders and motor cylinders.

18. A power transmission apparatus comprising a driving member, a fluid pump turning with the driving member and comprising cylinders, a driven shaft, means on the driven shaft for operating said pump, a fluid operated motor turning with the driven shaft and receiving fluid from said pump and applying power to the driven shaft, said motor comprising cylinders in a plane parallel with but axially spaced from the pump cylinders, a stationary structure between the pump and motor having fluid distributing conduits therein adapted to establish communication between discharging pump cylinders and receiving motor cylinders and between discharging motor cylinders and receiving pump cylinders, the driven shaft having longitudinal channels provided therein communicating with the pump cylinders and motor cylinders and also communicating with ports provided in said shaft within the aforesaid stationary structure, said ports being arranged in the rotation of the shaft to communicate with the fluid distributing conduits in said structure, and valve means in said structure for controlling fluid flow through said fluid distributing conduits, said valve means being adapted for establishing direct communication between discharging and receiving pump cylinders.

19. A power transmission apparatus comprising a driving stub shaft, a plurality of radially arranged pump cylinders turning with said shaft, a two-section driven shaft disposed in end-to-end coaxial relation with the stub shaft, the near section having an eccentric on the adjacent end thereof providing an off-center bearing for the pump cylinders, a plurality of radially arranged motor cylinders turning with the far section, the motor cylinders being in a plane substantially parallel with the pump cylinders, means providing a detachable driving connection between the two shaft sections at their adjoining ends, a stationary structure between the pump and motor providing a bearing for the interconnected ends of said shaft sections, said structure also having fluid distributing conduits therein adapted to establish communication between discharging pump cylinders and receiving motor cylinders and between discharging motor cylinders and receiving pump cylinders, longitudinal conduits in each of the shaft sections terminating in ports in said stationary structure arranged to communicate with the fluid distributing conduits therein, the longitudinal conduits in the near section communicating with the pump cylinders and the longitudinal conduits in the far section communicating with the motor cylinders, and valve means in the stationary structure for controlling fluid flow through the fluid conduits, said valve means being adapted for establishing direct communication between discharging and receiving pump cylinders.

20. A power transmission apparatus comprising a driving member, a fluid pump turning with the driving member and comprising cylinders, a driven shaft, means on the driven shaft for operating said pump, a fluid operated motor turning with the driven shaft and receiving fluid from said pump and applying power to the driven shaft, said motor comprising cylinders in a plane parallel with but axially spaced from the pump cylinders, a stationary structure into which a portion of said shaft extends, said structure having fluid distributing conduits therein adapted to establish communication between discharging pump cylinders and receiving motor cylinders and between discharging motor cylinders and receiving pump cylinders, the driven shaft having longitudinal channels provided therein communicating with the pump cylinders and motor cylinders and also communicating with ports provided in said shaft within the aforesaid stationary structure, said ports being arranged in the rotation of the shaft to communicate with the fluid distributing conduits in said structure, and valve means in said structure for controlling fluid flow through said fluid distributing conduits, said valve means being adapted for establishing direct communication between discharging and receiving pump cylinders.

21. In a fluid operated transmission, the combination of a power operated rotary pump, a stationary support therefor, a hollow driven shaft extending from said pump, the pump having working chambers for the intake and discharge of fluid, a motor in coaxially spaced relation to said pump and comprising an outer rotor surrounding the other end of said shaft and an inner rotor on said shaft, the motor having working chambers to receive fluid from the pump, a stationary support for said motor, a housing between the pump and motor connecting said stationary supports, control means in said housing arranged to control the flow of fluid back and forth between the pump and motor, and said shaft having passages provided therein for conducting fluid relative to the control means to and from the pump and motor.

22. A power transmission apparatus comprising a driving stub shaft, a plurality of radially arranged pump cylinders turning with said shaft, a driven shaft disposed in end to end coaxial relation with the stub shaft and having an eccentric on the end thereof providing an off-center bearing for the pump cylinders, a plurality of radially arranged motor cylinders turning with said driven shaft at its other end, the motor cylinders being in a plane substantially parallel with the pump cylinders, a stationary structure between the pump and motor providing a bearing for the intermediate portion of said driven shaft, said structure also having fluid distributing conduits therein adapted to establish communication between discharging pump cylinders and receiving motor cylinders and between discharging motor cylinders and receiving pump cylinders, longitudinal conduits in each end portion of the shaft terminating in ports in the stationary structure arranged to communicate with the fluid distributing conduits therein, the longitudinal conduits in the one end portion communicating with the pump cylinders and the longitudinal conduits in the other end portion communicating with the motor cylinders, and valve means in the stationary structure for controlling fluid flow through the fluid conduits, said valve means being adapted for establishing direct communication between discharging and receiving pump cylinders.

23. A power transmission apparatus comprising a stationary enclosing housing structure providing therein a pump chamber at one end and a motor chamber at the other end and an intermediate valve chest portion, a revolving pump mechanism in the pump chamber, a revolving motor mechanism in the motor chamber coaxially disposed with respect to the pump mechanism, one of said mechanisms being driven from a suitable power source and the other of said mechanisms being arranged to be fluid driven from the first mechanism, a rotary shaft common to the pump and motor mechanisms extending from the pump mechanism through the valve chest into the motor mechanism, the shaft having two sets of longitudinal bores provided therein, one set communicating with the pump mechanism and extending toward the valve chest, the other set communicating with the motor mechanism and extending toward the valve chest, the two sets terminating in spaced relation to one another in the valve chest, said valve chest having passages provided therein establishing communication between the two sets of bores, and valve means for controlling fluid flow through said passages.

24. A power transmission apparatus comprising a stationary enclosing housing structure providing therein a pump chamber at one end and a motor chamber at the other end and an intermediate valve chest portion, a revolving pump mechanism in the pump chamber, a revolving motor mechanism in the motor chamber, a driving shaft extending into the pump chamber to drive the pump mechanism, a driven shaft common to the pump and motor mechanisms extending from the pump mechanism through the valve chest into the motor mechanism and projecting from the motor chamber for driving connection with means to be driven thereby, the shaft having two sets of longitudinal bores provided therein, one set communicating with the pump mechanism and extending toward the valve chest, the other set communicating with the motor mechanism and extending toward the valve chest, the two sets terminating in spaced relation to one another in the valve chest, said valve chest having passages provided therein establishing communication between the two sets of bores, and valve means for controlling fluid flow through said passages.

25. A power transmission apparatus comprising a stationary enclosing housing structure providing therein a pump chamber at one end and a motor chamber at the other end and an intermediate valve chest portion, a revolving pump mechanism in the pump chamber, a revolving motor mechanism in the motor chamber, one of said mechanisms being driven from a suitable power source and the other of said mechanisms being arranged to be fluid driven from the first mechanism, a shaft common to the pump and motor mechanisms extending from the pump mechanism through the valve chest into the motor mechanism, the shaft having two sets of longitudinal bores provided therein, one set communicating with the pump mechanism and extending toward the valve chest, the other set communicating with the motor mechanism and extending toward the valve chest, the two sets terminating in spaced relation to one another in the valve chest, said valve chest having passages provided therein establishing communication between the two sets of bores, and valve means for controlling fluid flow through said passages, the pump and motor chambers having sumps communicating with one another in the valve chest portion of the housing structure, and said valve chest including an intake passage communicating with said sumps.

26. A power transmission apparatus comprising a stationary enclosing housing structure providing therein a pump chamber at one end and a motor chamber at the other end and an intermediate valve chest portion, a driving shaft extending into the pump chamber, a driven shaft in coaxial relation therewith extending from the pump chamber through the valve chest into the motor chamber, a pump eccentric on said driven shaft in the pump chamber, providing for fixed displacement of the pump, a motor cylinder block on said driven shaft in the motor chamber, said shaft having longitudinal passages provided therein extending from the eccentric toward the valve chest and from the cylinder block toward the valve chest, said passages terminating in spaced relation to one another in the valve chest, said valve chest having passages provided therein establishing communication between the two sets of shaft passages, valve means for controlling fluid flow through the passages in the valve chest, a pump cylinder block rotatable on the eccentric in the pump chamber and having a driving connection with the driving shaft, and a motor rotor radially adjustable with respect to the motor block in the motor chamber and having pistons operating in the bores thereof.

27. In a fluid operated transmission, the combination of a central control housing, a rotary, power transmitting shaft extending therethrough, a fluid circulating mechanism on both ends of said shaft, at least one of said mechanisms being of a variable delivery type, one mechanism being driven from a suitable power source, said shaft being independent of mechanical connection with said mechanism and extending therefrom to the other mechanism which is adapted to be operated by fluid delivered from the first mechanism, conduits in said shaft extending from the control housing in opposite directions to the two mechanisms for the flow of fluid to and from the working chambers thereof whereby both mechanisms exert torque on said shaft, and control means in said housing for controlling fluid flow in said conduits.

28. In a hydraulic transmission, a pump, a motor, means to drive the pump, and a hollow shaft having an eccentric thereon whereon said pump revolves, said shaft turning with the eccentric and extending through the motor and turning therewith and being adapted to transmit power from the transmission, said shaft conducting fluid therethrough between the pump and motor whereby they are hydraulically connected.

29. A hydraulic transmission as set forth in claim 28 wherein the pump due to the eccentric has constant strokes and wherein the motor is of a variable stroke type, the transmission including means for adjusting the eccentricity of said motor with respect to the shaft whereby to vary the torque transmitted to the shaft or reverse the direction of rotation of the latter.

30. In a hydraulic transmission, a shaft supported for rotation having an eccentric and a motor cylinder block thereon rotatable therewith, and having passages provided therein establishing communication between ports in the eccentric and radial bores in said block, a pump driven in concentric relation to said shaft having an off-center cylinder block revolving on said eccentric with its radial bores communicating with the ports in the latter, and a rotary piston assembly having radial pistons operable in the radial bores of the motor cylinder block.

31. A transmission as set forth in claim 30 including means for adjusting the piston assembly with respect to the shaft to vary the strokes thereof.

32. A transmission as set forth in claim 30 including means for adjusting the piston assembly in either direction from concentric relation to the shaft to vary the strokes of the pistons or secure drive of the shaft in either direction.

33. A hydraulic transmission unit comprising a constant stroke pump including a series of piston and cylinder assemblies grouped about a center, a variable stroke motor including a series of piston and cylinder assemblies grouped about a center, a rotary member extending from the one center to the other, an eccentric thereon on which the pump operates with constant strokes of its pistons, said motor being movable relative to said member to vary the stroke of its pistons, and passages in said member forming hydraulic connections between said pump and motor.

34. A hydraulic transmission unit comprising a constant stroke pump including a series of piston and cylinder assemblies grouped about a center, a drive shaft driving said pump, a variable stroke motor including a series of piston and cylinder assemblies grouped about a center, a driven shaft concentric with the drive shaft extending from the first center to the second, an eccentric thereon on which the pump operates with constant strokes of its pistons, said motor being movable relative to said driven shaft to vary the strokes of its pistons, and passages in said driven shaft forming hydraulic connections between said pump and motor.

35. A transmission unit as set forth in claim 34 wherein the motor is adjustable from concentric relation to said shaft in either direction to vary the stroke of the pistons or secure drive of the driven shaft in either direction.

36. A hydraulic transmission comprising a constant displacement pump, a variable displacement motor, a rotary member extending from the pump to the motor, an eccentric on said member providing fixed pump displacement, means for driving said pump relative to said eccentric, said rotary member being adapted to transmit power from said transmission, the motor being adjustable relative to said member to vary its displacement or secure drive of said rotary member in either direction, passages in said member communicating with said pump, other passages in said member communicating with said motor, and valve means controlling communication between said passages.

37. The combination in a hydraulic transmission of a radial piston type pump device, a radial piston type motor device, both devices being of the type having a cylinder block with radial bores open at their outer ends and pistons entered in the outer ends of said bores for reciprocation therein, a valve chest intermediate the pump and motor devices, means transmitting drive to one of said devices, the one device having fixed piston strokes, an adjustable means for varying the piston strokes of the other device, a rotary shaft extending from one device to the other through the valve chest and having longitudinal passages provided therein extending from the valve chest in opposite directions to the two devices to conduct fluid to and from the pistons thereof in the rotation of said shaft with said devices.

38. The combination in a hydraulic transmission of a radial piston type pump device, a radial piston type motor device, both devices being of the type having a cylinder block with radial bores open at their outer ends and pistons entered in the outer ends of said bores for reciprocation therein, a valve chest intermediate the pump and motor devices, means transmitting drive to one of said devices, the pump device having fixed piston strokes, an adjustable means for varying the piston strokes of the motor device, a rotary shaft extending from one device to the other through the valve chest and having longitudinal passages provided therein extending from the valve chest in opposite directions to the two devices to conduct fluid to and from the pistons thereof in the rotation of said shaft with said devices.

ADOLF G. SCHNEIDER.